US006538642B2

(12) United States Patent
Tsai

(10) Patent No.: US 6,538,642 B2
(45) Date of Patent: Mar. 25, 2003

(54) PORTABLE INPUT APPARATUS

(76) Inventor: Huo-Lu Tsai, No. 126-1, Shui-Nan Rd., Pei-Tun Dist., Taichung City (TW)

( * ) Notice: Subject to any disclaimer, the term of this patent is extended or adjusted under 35 U.S.C. 154(b) by 222 days.

(21) Appl. No.: 09/777,932

(22) Filed: Feb. 6, 2001

(65) Prior Publication Data

US 2002/0105502 A1 Aug. 8, 2002

(51) Int. Cl.$^7$ .................................................. G09G 5/00
(52) U.S. Cl. ........................ 345/168; 361/686; 361/680
(58) Field of Search ................................. 361/679, 680, 361/681, 683, 686; 345/168–172; 341/22; 400/82, 88, 89, 693; D14/391, 392; 235/145 R

(56) References Cited

U.S. PATENT DOCUMENTS

| | | | | |
|---|---|---|---|---|
| 5,638,257 A | * | 6/1997 | Kumar et al. | 361/680 |
| 5,712,760 A | * | 1/1998 | Coulon et al. | 361/680 |
| 5,872,557 A | * | 2/1999 | Wiemer et al. | 345/156 |
| 6,108,200 A | | 8/2000 | Fullerton | 361/686 |
| 6,317,313 B1 | * | 11/2001 | Mosgrove et al. | 361/680 |
| 6,457,996 B1 | * | 10/2002 | Shih | 439/638 |

* cited by examiner

Primary Examiner—Richard Hjerpe
Assistant Examiner—Alexander Eisen
(74) Attorney, Agent, or Firm—Merchant & Gould P.C.

(57) ABSTRACT

A portable input apparatus includes a keyboard unit, and a cover pivotally connected to a rear end of the keyboard unit. The cover is operable so as to move from a closed position, where an inner surface of the cover overlies a top surface of the keyboard unit, to an opened position, where the angle between the inner surface and the top surface is substantially 180 degrees. An interface assembly is provided on the top surface of the keyboard unit adjacent to the rear end of the latter, and includes an input/output connector adapted to be connected to an input/output port of a computerized apparatus. A support member is provided on the top surface of the keyboard unit adjacent to the rear end, and is pivotally connected to the rear end of the keyboard unit. The support member is received between the keyboard unit and the cover when the cover is at the closed position, and is movable to a supporting position so as to be adapted to permit the computerized apparatus to lean thereon when the cover is at the opened position.

9 Claims, 9 Drawing Sheets

PORTABLE INPUT APPARATUS

BACKGROUND OF THE INVENTION

1. Field of the Invention

The invention relates to a portable input apparatus, more particularly to a portable input apparatus with a keyboard for use in conjunction with a small computerized apparatus.

2. Description of the Related Art

FIGS. 1 and 2 illustrate a conventional handheld computer keyboard system, as proposed in U.S. Pat. No. 6,108,200, that includes a keyboard portion 1, a cover portion 2 and an interface assembly 3. The keyboard portion 1 has a top surface 101 provided with a plurality of keys 103, and a bottom surface 102. The keyboard portion 1 further has a stabilizing leg 4 mounted retractably thereto at the bottom surface 102. The cover portion 2 is pivotally connected to the keyboard portion 1, and has an inner surface 201, and an outer surface 202 opposite to the inner surface 201. The cover portion 2 is operable so as to move from a closed position, where the inner surface 201 overlies the top surface 101 of the keyboard portion 1, to an opened position, where the cover portion 2 forms an angle with the top surface 101. The interface assembly 3 is mounted on the inner surface 201 of the cover portion 2, and includes an input/output connector 301 to be connected to an input/output port 501 of a computerized apparatus 5, such as a personal digital assistant or a mobile telephone, that is supported by the cover portion 2 when the latter is at the opened position.

The following are some of the drawbacks of the conventional handheld computer keyboard system:

1. In use, the stabilizing leg 4 must be pulled outwardly from the keyboard portion 1 such that tipping over backward of the conventional keyboard system with the computerized apparatus can be prevented. The act of outward pulling of the stabilizing leg 4 is usually forgotten by the user.
2. Since the interface assembly 3 is mounted on the cover portion 2, and since the space between the input/output connector 301 and the inner surface 201 is fixed, the conventional keyboard system cannot be adapted for use with another computerized apparatus of a different thickness.
3. Due to the stacked construction of the keyboard portion 1, the interface assembly 3 and the cover portion 2, the conventional keyboard system has a relatively larger thickness that makes is relatively inconvenient to carry.

SUMMARY OF THE INVENTION

Therefore, the object of the present invention is provide a portable input apparatus that can overcome the drawbacks associated with the aforesaid prior art.

According to one aspect of the present invention, a portable input apparatus comprises:

- a keyboard unit having front and rear ends, a bottom surface, and a top surface provided with a plurality of keys thereon;
- a cover having a pivot end pivotally connected to the rear end of the keyboard unit, an inner surface and an outer surface opposite to the inner surface, the cover being operable so as to move from a closed position, where the inner surface of the cover overlies the top surface of the keyboard unit, to an opened position, where the angle between the inner surface and the top surface is substantially 180 degrees;
- an interface assembly provided on the top surface of the keyboard unit adjacent to the rear end and including an input/output connector adapted to be connected to an input/output port of a computerized apparatus;
- a support member provided on the top surface of the keyboard unit adjacent to the rear end and having a pivotal portion pivotally connected to the rear end of the keyboard unit, a first surface, and a second surface opposite to the first surface, the support member being received between the keyboard unit and the cover when the cover is at the closed position, and being movable to a supporting position so as to be adapted to permit the computerized apparatus to lean on the first surface when the cover is at the opened position; and
- engaging means for engaging the support member to limit pivotal movement of the support member at the supporting position.

According to another aspect of the present invention, a portable input apparatus comprises

- a keyboard unit having front and rear ends, a bottom surface, and a top surface provided with a plurality of keys thereon;
- a cover having a pivot end pivotally connected to the rear end of the keyboard unit, an inner surface and an outer surface opposite to the inner surface, the cover being operable so as to move from a closed position, where the inner surface of the cover overlies the top surface of the keyboard unit, to an opened position, where the angle between the inner surface and the top surface is substantially 180 degrees;
- an interface assembly including an input/output connector adapted to be connected the keyboard unit to an input/output port of a computerized apparatus;
- a support member provided on the top surface of the keyboard unit adjacent to the rear end and having a pivotal portion pivotally connected to the rear end of the keyboard unit, a first surface, and a second surface opposite to the first surface, the support member being received between the keyboard unit and the cover when the cover is at the closed position, and being movable to a supporting position so as to be adapted to permit the computerized apparatus to lean on the first surface when the cover is at the opened position; and
- a stop coupled to the cover and engaging the support member to limit pivotal movement of the support member at the supporting position at the supporting position, the stop projecting from the inner surface of the cover adjacent to the rear end of the keyboard unit, the pivotal portion of the support member being formed with a limiting edge that abuts against the stop to position the support member at the supporting position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
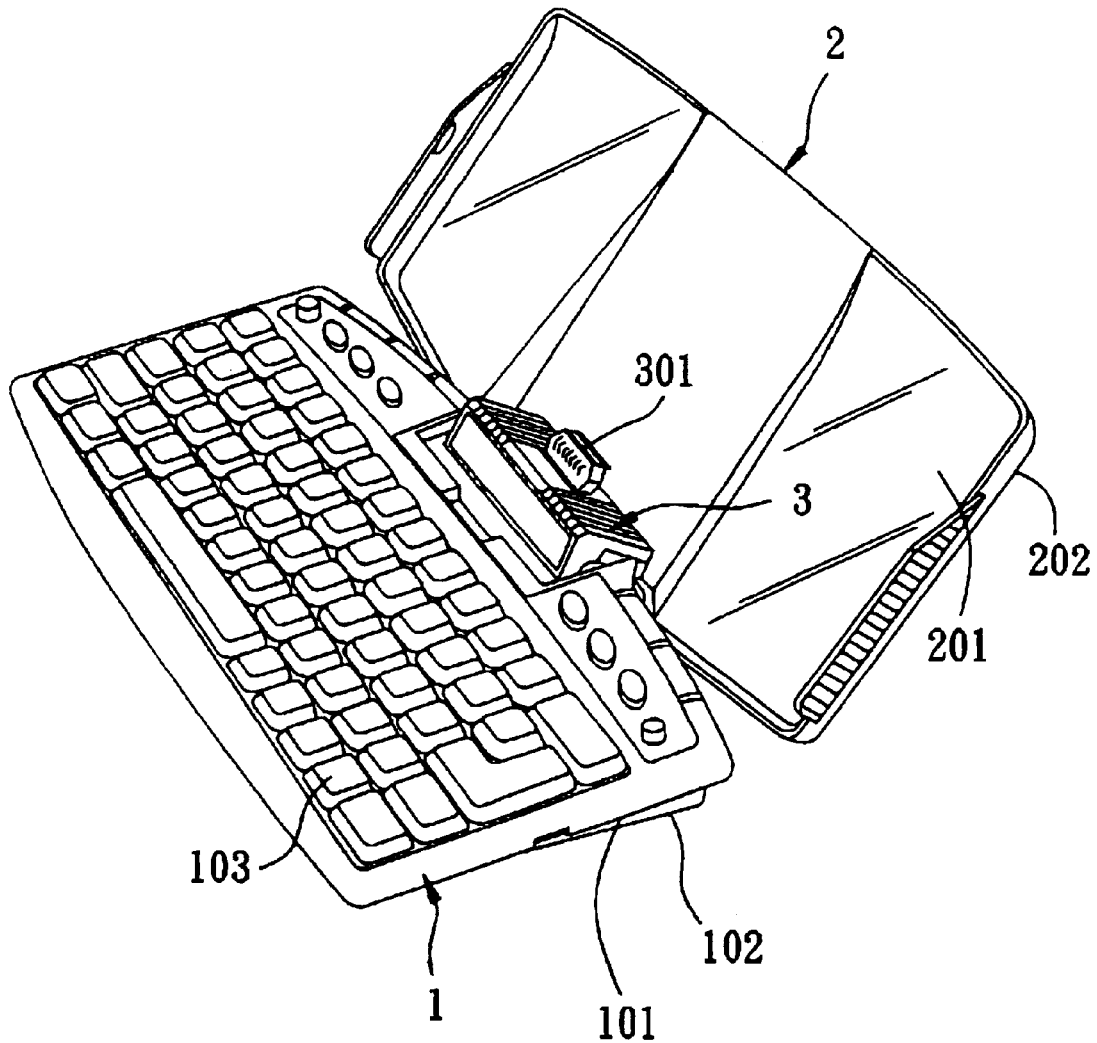
FIG. 1 is a perspective view of a conventional handheld computer keyboard system with a cover portion thereof in an opened position.
Figure 2:
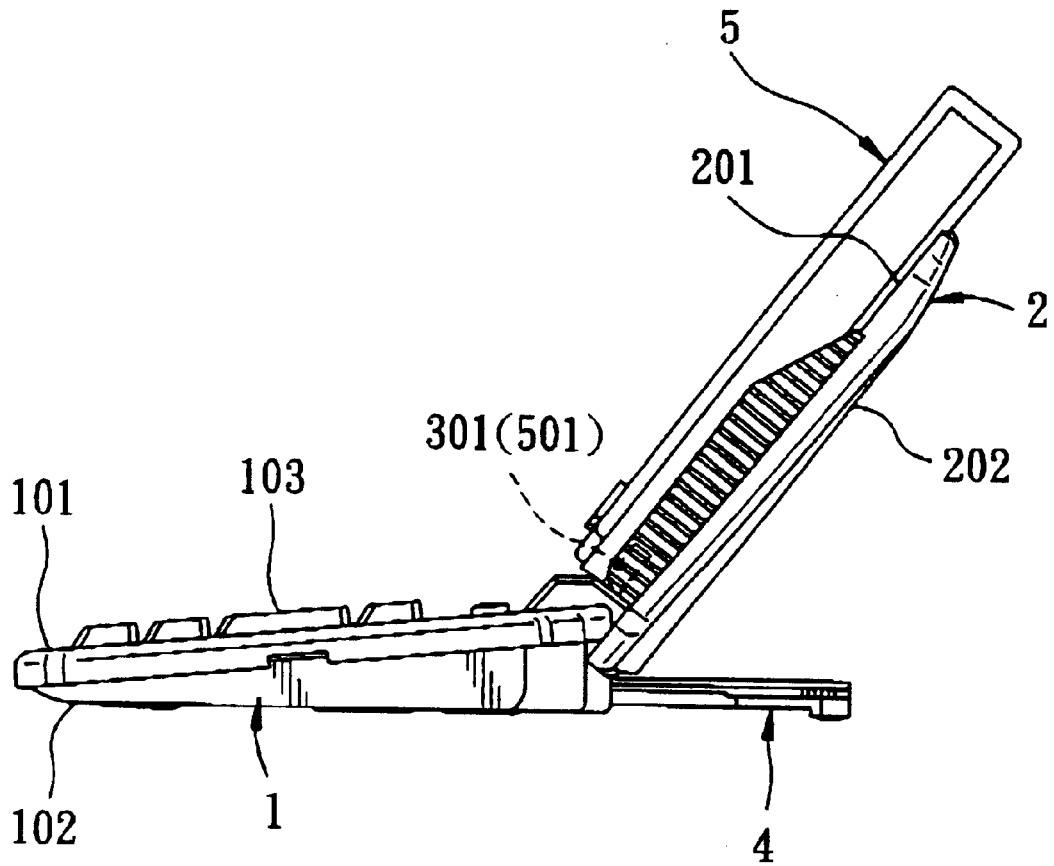
FIG. 2 is a side view of the conventional handheld computer keyboard system, with a personal digital assistant engaging an interface assembly of the keyboard system.

Before the present invention is described in greater detail, it should be noted that like elements are denoted by the same reference numerals throughout the disclosure.

Figure 3:
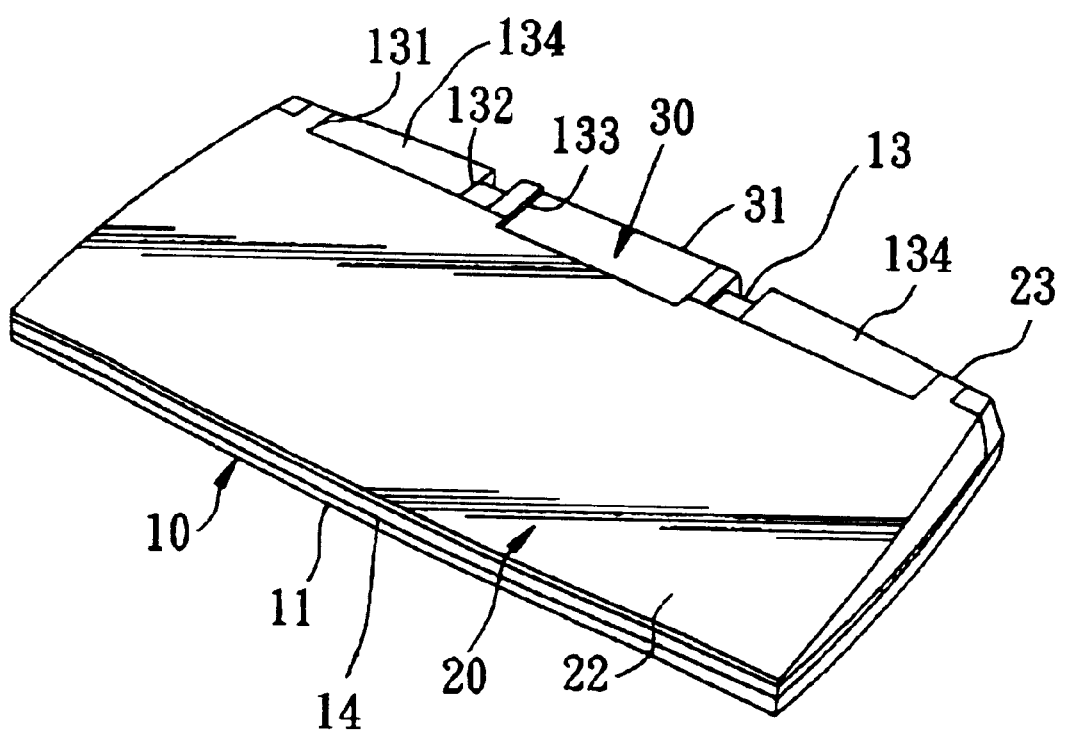
FIG. 3 is a perspective view of the first preferred embodiment of a portable input apparatus according to the present invention in a non-use state.
Figure 4:
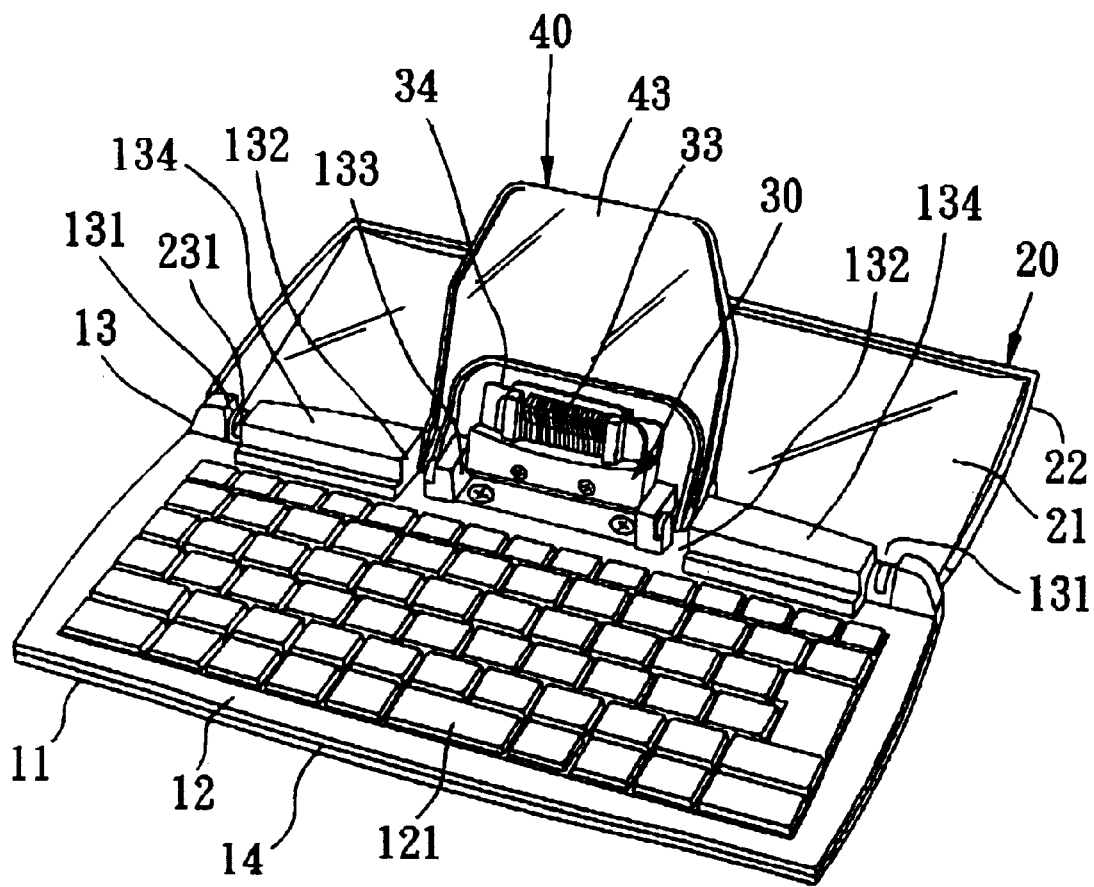
FIG. 4 is a perspective view of the first preferred embodiment in a state of use.
Figure 5:
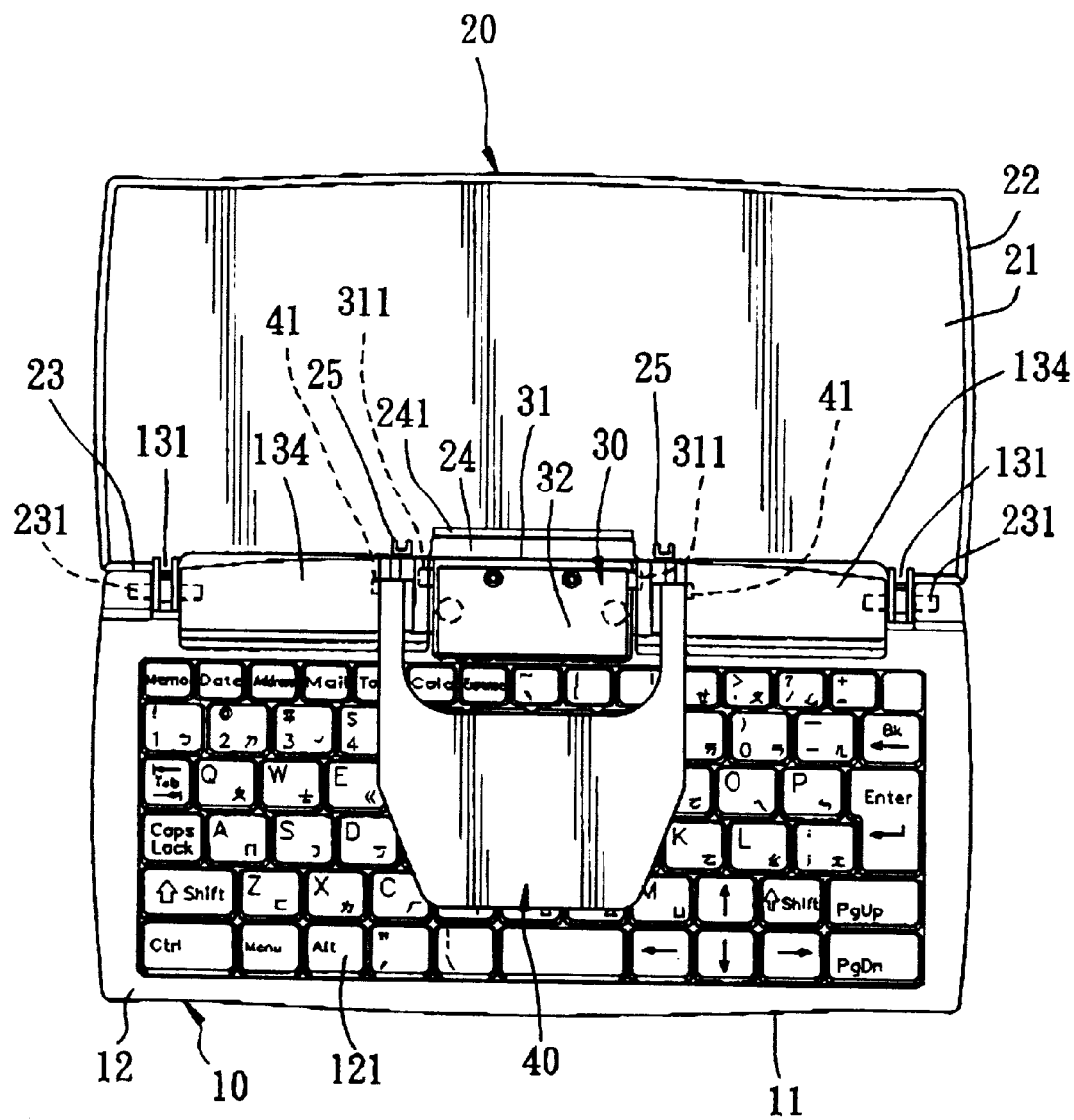
FIG. 5 is a top view of the first preferred embodiment when a cover thereof is at an opened position.

Referring to FIGS. 3 to 5, according to the first preferred embodiment of the present invention, a portable input apparatus is shown to include a keyboard unit 10, a cover 20, an interface assembly 30, and a support member 40.

Figure 7:
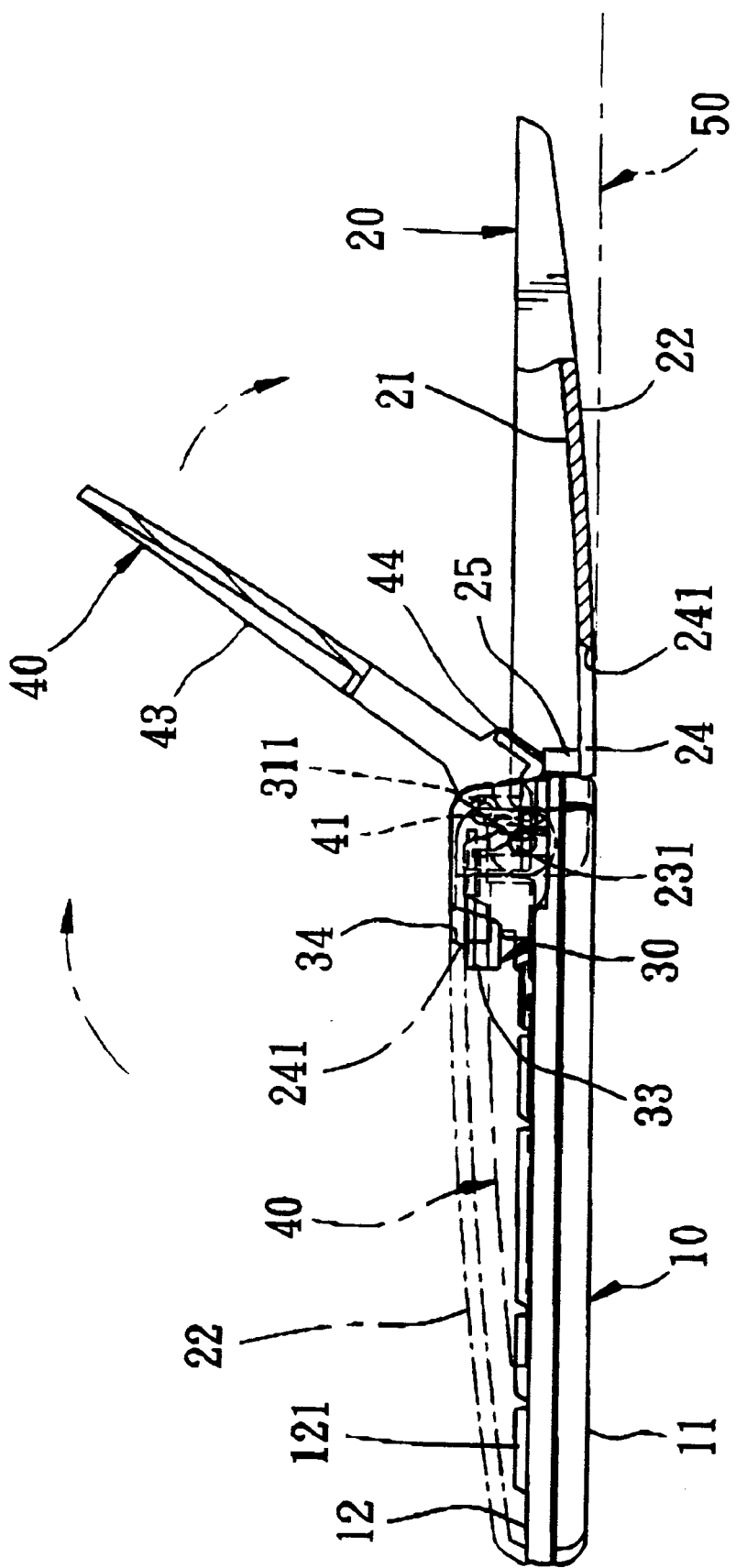
FIG. 7 is a partly sectional side view of the first preferred embodiment.

The keyboard unit 10 has front and rear ends 14, 13, a bottom surface 11, and a top surface 12 provided with a plurality of keys 121, which include alphanumeric keys and other function keys, thereon. The bottom surface 11 is adapted to be placed on a plane 50 during use for permitting input operations, as best shown in FIG. 7. The rear end 13 has opposite pivot blocks 134, each of which is formed with a first pivot groove 131, and a second pivot groove 132 opposite to the first pivot groove 131. A receiving groove 133 is formed between the pivot blocks 134.

The cover 20 has a pivot end 23 formed with opposite pivot pins 231 that are pivotally connected to the first pivot grooves 131 at the rear end 13 of the keyboard unit 10, respectively, an inner surface 21, and an outer surface 22 opposite to the inner surface 21. As shown in FIG. 7, the cover 20 is operable so as to move from a closed position, where the inner surface 21 of the cover 21 overlies the top surface 12 of the keyboard unit 10, to an opened position, where the angle between the inner surface 21 and the top surface 12 is substantially 180 degrees. The pivot end 23 is further formed with a notch 24 that is defined by a first bevel edge 241. The cover 20 further includes a pair of U-shaped stops 25 (see FIG. 5) coupled to and projecting from the inner surface 21 adjacent to the rear end 13 of the keyboard unit 10.

Figure 8:
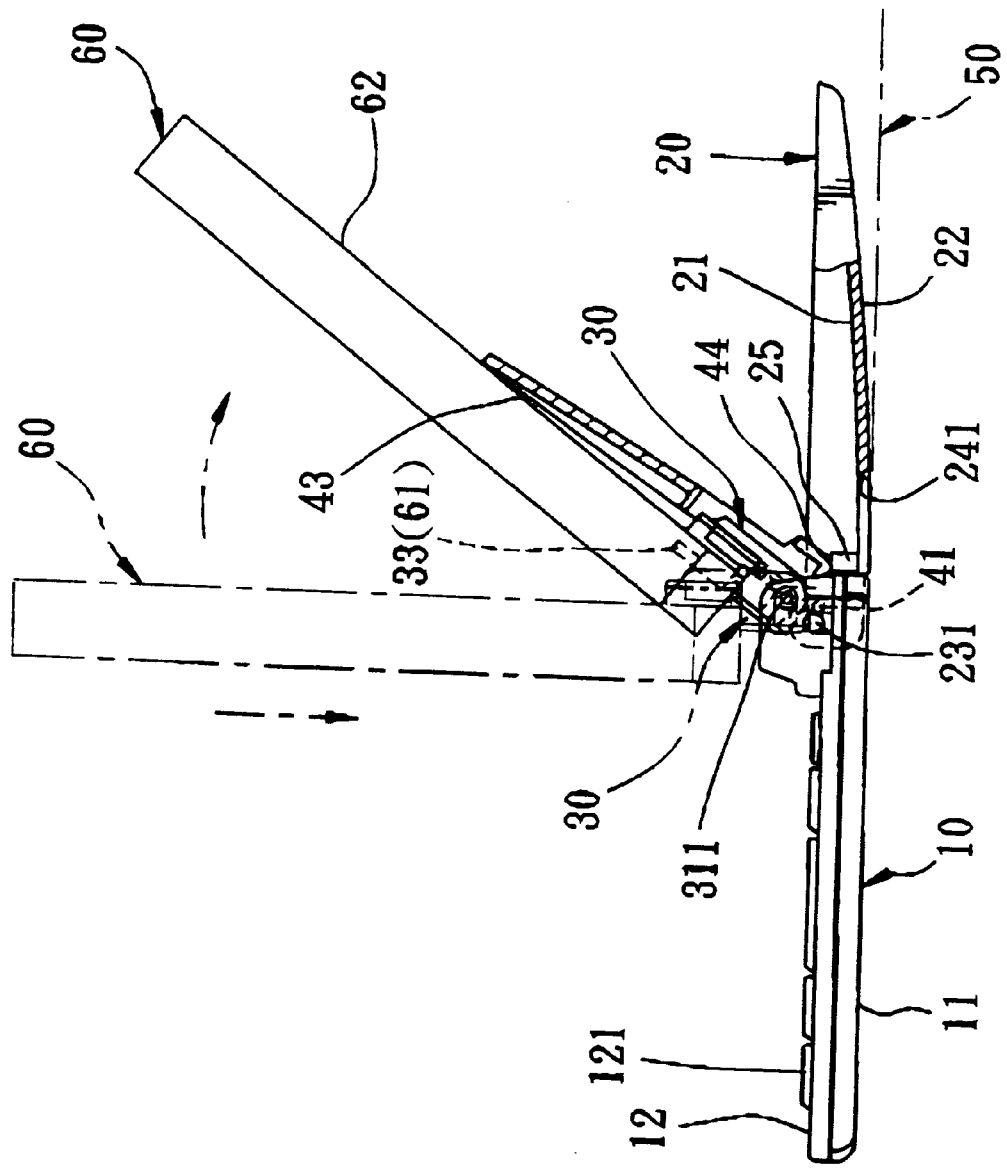
FIG. 8 is a partly sectional side view of the first preferred embodiment, with a personal digital assistant engaging an interface assembly of the input apparatus.

The interface assembly 30 is disposed in the receiving groove 133 on the top surface 12 of the keyboard unit 10 adjacent to the rear end 13, and has opposite pivot lugs 311 pivotally connected to the pivot blocks 134, respectively, so that the interface assembly 30 is pivotally mounted on the top surface 12 of the keyboard unit 10. The interface assembly 30 includes an input/output connector 33 adapted to couple the keyboard unit 10 electrically to an input/output port 61 of a computerized apparatus 60, such as a personal digital assistant or a mobile telephone, as best shown in FIG. 8. The notch 24 of the cover 20 permits extension of the interface assembly 30 thereinto when the cover 20 is at the closed position, as shown in FIG. 7. The interface assembly 30 is formed with a second bevel edge 34. The first and second bevel edges 241, 34 are complementary and engage each other when the cover 20 is at the closed position, thereby arresting the pivotal movement of the interface assembly 30, as shown in FIG. 7.

Figure 6:
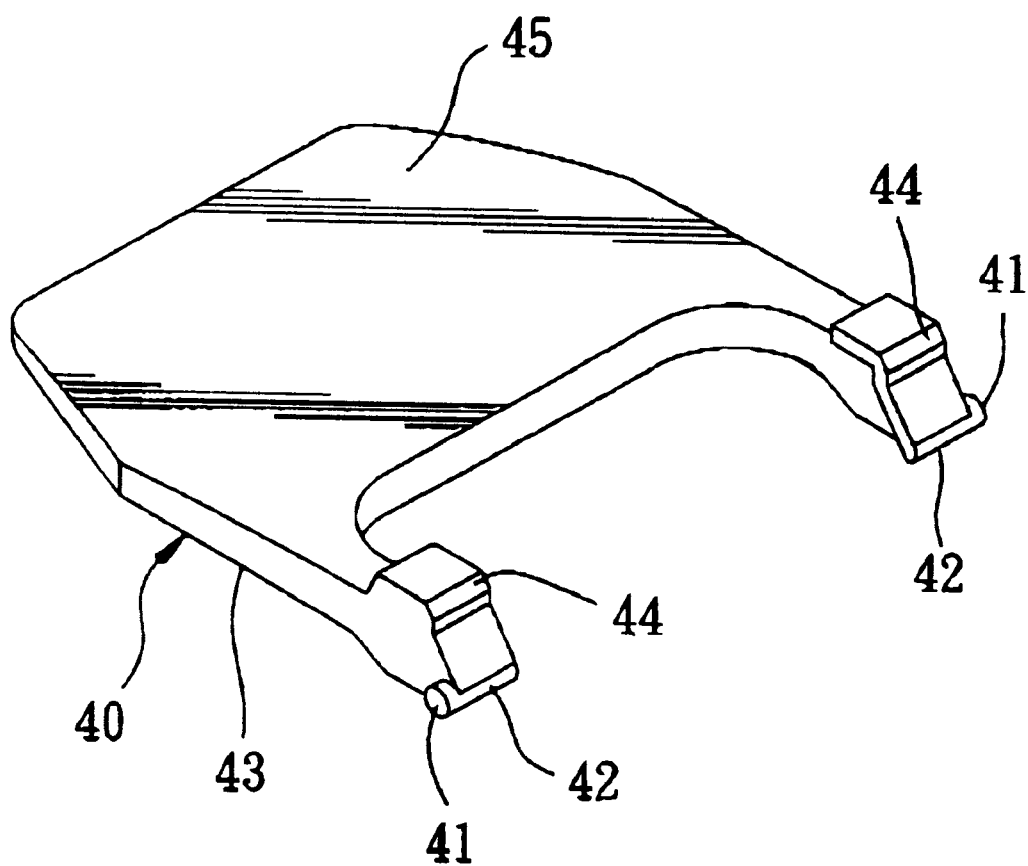
FIG. 6 is a perspective view of a support member of the first preferred embodiment.

With reference to FIGS. 6 and 7, the support member 40 is provided on the top surface 12 of the keyboard unit 10 adjacent to the rear end 13, and has a pivotal portion 42 pivotally connected to the second pivot grooves 132 at the rear end 13 of the keyboard unit 10 via opposite pivot lugs 41, a first surface 43, and a second surface 45 opposite to the first surface 43. The support member 40 is received between the keyboard unit 10 and the cover 20 when the cover 20 is at the closed position, and is movable to a supporting position so as to be adapted to permit the computerized apparatus 60 to lean on the first surface 43 when the cover 10 is at the opened position, as best shown in FIG. 8. The pivotal portion 42 is formed with a limiting edge 44 that abuts against the corresponding stop 25 to position the support member 40 at the supporting position, as shown in FIGS. 7 and 8.

Figure 9:
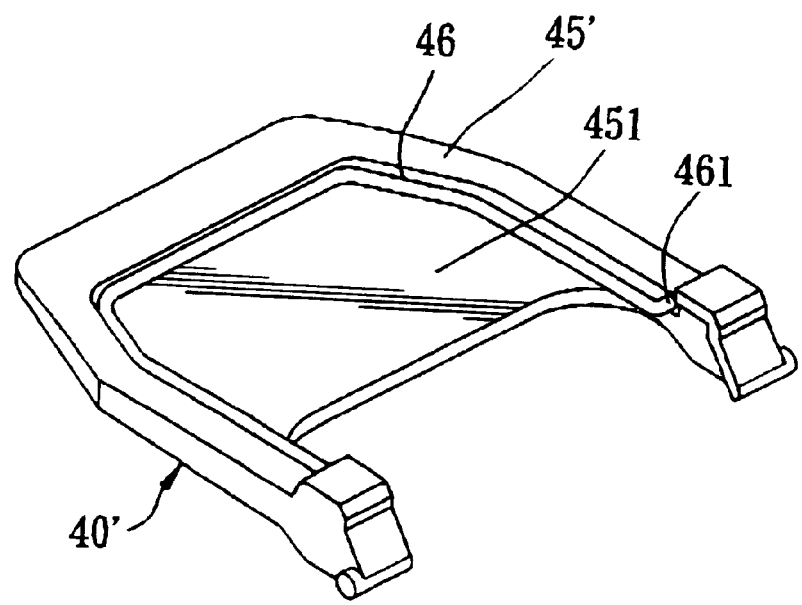
FIG. 9 is a perspective view of a support member of the second preferred embodiment of a portable input apparatus according to the present invention.
Figure 10:
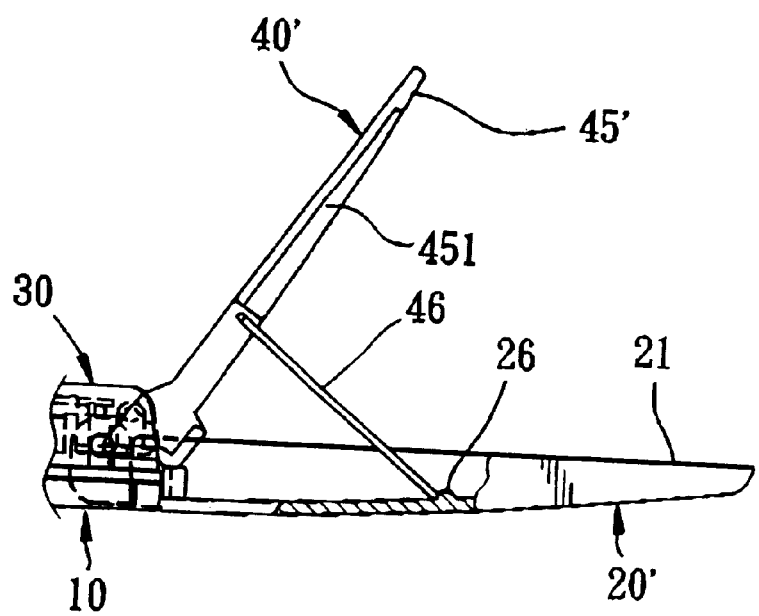
FIG. 10 is a fragmentary partly sectional side view of the second preferred embodiment in a state of use.

FIGS. 9 and 10 illustrate the second preferred embodiment of the present invention, which is a modification of the first preferred embodiment. Unlike the previous embodiment, the inner surface 21' of the cover 20' is further formed with an engaging projection 26. The second surface 45' of the support member 40' is formed with a frame-receiving recess 451 The support member 40' further has a U-shaped supporting frame 46 that is pivotally connected thereto via opposite ends 461 and that is received in the frame-receiving recess 451. The supporting frame 46 is operable to pivot outwardly of the frame-receiving recess 451 such that the supporting frame 46 forms an angle with the support member 40' and the cover 20' and such that the engaging projection 26 engages the supporting frame 46 for positioning the support member 40' at the supporting position.

The following are some of the advantages attributed to the input apparatus of the present invention:
1. Since the cover 20, 20' must be moved to the opened position prior to the insertion of the computerized apparatus 60 of the conventional keyboard system described beforehand, the problem associated with the stabilizing leg can be overcome, thereby resulting in enhanced safety.
2. Due to the engagements between the limiting edge 44 and the stop 25 in the first preferred embodiment, and between the engaging projection 26 and the supporting frame 46 in the second preferred embodiment, the portable input apparatus of this invention can ensure proper positioning of the support member 40, 40'.
3. Since the interface assembly 30 is pivotally mounted on the top surface 12 of the keyboard unit 10, and is not fixed to the cover 20, 20', the interface assembly 30 can be adapted for use with different computerized apparatuses of different thicknesses.
4. Due to the presence of the notch 24, the cover 20, 20' is flush with the interface assembly 30 when the cover 20, 20' is at the closed position, thereby resulting in a relatively smaller size that facilitates carrying of the input apparatus of this invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A portable input apparatus comprising:
   a keyboard unit having front and rear ends, a bottom surface, and a top surface provided with a plurality of keys thereon;

a cover having a pivot end pivotally connected to said rear end of said keyboard unit, an inner surface and an outer surface opposite to said inner surface, said cover being operable so as to move from a closed position, where said inner surface of said cover overlies said top surface of said keyboard unit, to an opened position, where the angle between said inner surface and said top surface is substantially 180 degrees;

an interface assembly provided on said top surface of said keyboard unit adjacent to said rear end and including an input/output connector adapted to be connected to an input/output port of a computerized apparatus;

a support member provided on said top surface of said keyboard unit adjacent to said rear end and having a pivotal portion pivotally connected to said rear end of said keyboard unit, a first surface, and a second surface opposite to said first surface, said support member being received between said keyboard unit and said cover when said cover is at the closed position, and being movable to a supporting position so as to be adapted to permit the computerized apparatus to lean on said first surface when said cover is at the opened position; and engaging means for engaging said support member to limit pivotal movement of said support member at the supporting position.

2. The portable input apparatus of claim 1, wherein said interface assembly is pivotally mounted on said top surface of said keyboard unit.

3. The portable input apparatus of claim 1, wherein said engaging means includes a stop that projects from said inner surface of said cover adjacent to said rear end of said keyboard unit.

4. The portable input apparatus of claim 3, wherein said pivotal portion of said support member is formed with a limiting edge that abuts against said stop to position said support member at the supporting position.

5. The portable input apparatus of claim 1, wherein said pivot end of said cover is formed with a notch that permits extension of said interface assembly thereinto when said cover is at the closed position.

6. The portable input apparatus of claim 2, wherein said pivot end of said cover is formed with a notch that permits extension of said interface assembly thereinto when said cover is at the closed position.

7. The portable input apparatus of claim 6, wherein said notch and said interface assembly are formed with complementary bevel edges that engage each other when said cover is at the closed position, thereby arresting the pivotal movement of said interface assembly.

8. The portable input apparatus of claim 1, wherein said inner surface of said cover is further formed with an engaging projection, said second surface of said support member being formed with a frame-receiving recess, said support member further having a supporting frame that is pivotally connected thereto and that is received in said frame-receiving recess, said supporting frame being operable to pivot outwardly of said frame-receiving recess such that said supporting frame forms an angle with said support member and said cover and such that said engaging projection engages said supporting frame for positioning said support member at the supporting position.

9. A portable input apparatus comprising:

a keyboard unit having front and rear ends, a bottom surface, and a top surface provided with a plurality of keys thereon;

a cover having a pivot end pivotally connected to said rear end of said keyboard unit, an inner surface and an outer surface opposite to said inner surface, said cover being operable so as to move from a closed position, where said inner surface of said cover overlies said top surface of said keyboard unit, to an opened position, where the angle between said inner surface and said top surface is substantially 180 degrees;

an interface assembly including an input/output connector adapted to be connected said keyboard unit to an input/output post of a computerized apparatus;

a support member provided on said top surface of said keyboard unit adjacent to said rear end and having a pivotal portion pivotally connected to said rear end of said keyboard unit, a first surface, and a second surface opposite to said first surface, said support member being received between said keyboard unit and said cover when said cover is at the closed position, and being movable to a supporting position so as to be adapted to permit the computerized apparatus to lean on said first surface when said cover is at the opened position; and a stop coupled to said cover and engaging said support member to limit pivotal movement of said support member at the supporting position at the supporting position, said stop projecting from said inner surface of said cover adjacent to said rear end of said keyboard unit, said pivotal portion of said support member being formed with a limiting edge that abuts against said stop to position said support member at the supporting position.

* * * * *